J. ALLER.
SADDLE FOR MOTOR AND OTHER CYCLES.
APPLICATION FILED NOV. 10, 1916.
1,232,165.
Patented July 3, 1917.
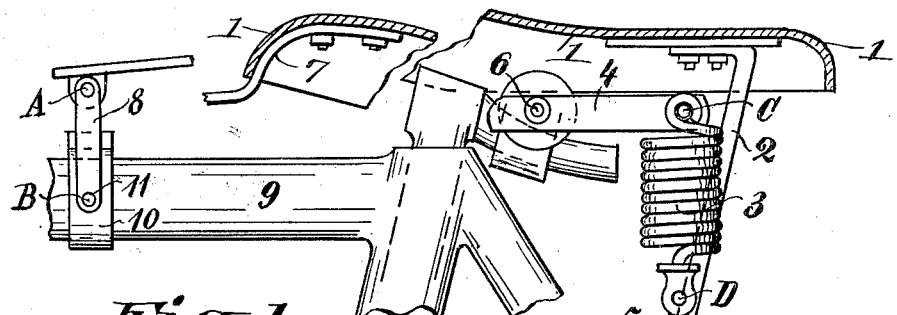
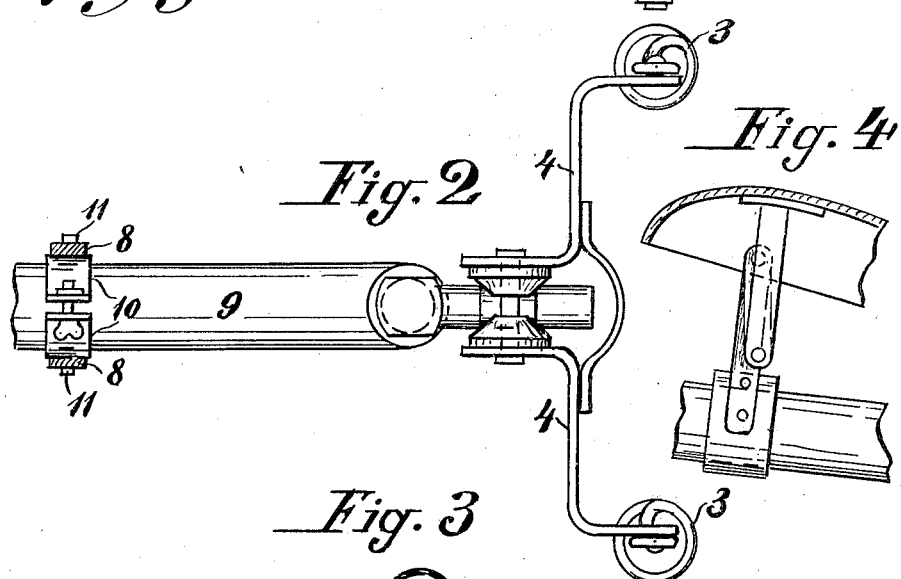
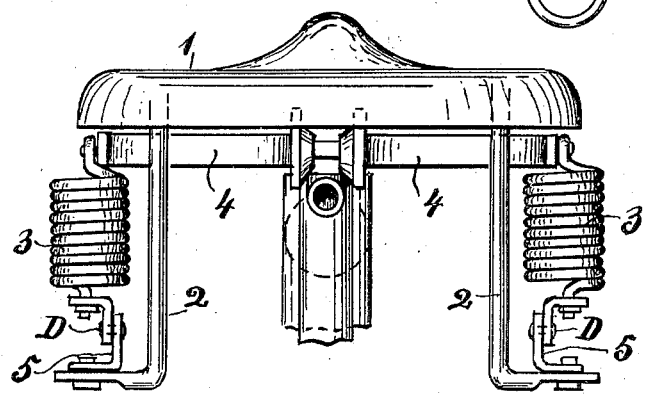

UNITED STATES PATENT OFFICE.

JENS ALLER, OF COPENHAGEN, DENMARK.

SADDLE FOR MOTOR AND OTHER CYCLES.

1,232,165. Specification of Letters Patent. Patented July 3, 1917.

Application filed November 10, 1916. Serial No. 130,644.

*To all whom it may concern:*

Be it known that I, JENS ALLER, a subject of the King of Denmark, and residing at Copenhagen, Strandvej 138b, have invented new and useful Improvements in or relating to Saddles for Motor and other Cycles, of which the following is a specification.

My invention relates to saddles for motor and other cycles and refers more particularly to the means for supporting the saddle top.

It has been proposed to connect the front end of the saddle top to the frame tube by means of a rigid projection linked at its forward end to a clip on the top tube of the frame, and to support the back of the top by means of thrust-rods adapted to distend tension-springs connected at their lower ends to the rods and at their upper ends to the carrier or a bracket on the machine frame.

In another construction the front of the seat top has been connected to the frame by a pair of substantially vertical links, and the rear of the top supported by tension springs connected at their lower ends to the bottoms of thrust-rods depending from the top, the same springs being connected at their upper ends to the outer extremities of transverse members of the saddle underframe.

My invention consists in providing the front of the seat top with a projecting bar connected at its forward end to the top tube of the cycle frame by a pair of vertical links, the rear of the top being supported by tension-springs connected at their lower ends by joint pieces to the bottoms of thrust-rods carried by the top and at their upper ends to the outer extremities of transverse members which are clipped to the ordinary saddle support and have free forward ends a short distance in front of the clip.

The invention is shown in the accompanying drawings in which:

Figure 1 shows a side view of the arrangement with the saddle in its normal position, Fig. 2 is a plan view with the saddle top removed and Fig. 3 is a rear elevation.

Fig. 4 shows a modification of the links on the front end.

The saddle top 1 is hung in position by rods 2 connected to the lower ends of springs 3, the said springs being fastened in substantially known manner to the transverse members or support 4 of the saddle.

The said rods are not, however, as usual firmly fixed to the springs 3, but on the contrary are movably attached by means of joints 5. Furthermore the front end of the metal support 4 does not as usual extend to the front end of the saddle and is not fixed to it, but is cut off immediately in front of the clamp pin 6.

A bent bar 7 extends from the front part of the saddle top and is, at its forward end, movably secured to the top bar of the cycle frame 9, by means of vertical links 8. The attachment can for instance be made by the aid of a coupling 10, carrying on each side a pivot 11, to which the links 8 are fastened.

Instead of the links 8, shown in Fig. 1, the links 8ª, shown in Fig. 4 can be used.

It will be seen that there are four movable joints A, B, C, D, and in consequence the saddle can (turning around point B), move backward and forward and also have a swinging motion in these two directions, and by resting upon springs 3 the saddle is rendered so resilient that bumping and shocks are absorbed.

Instead of a single rod 2, on each side, two may be employed which unite at the lower end of the spring.

The point of suspension of springs 3, can be placed nearer the pins 6 than shown.

Having now particularly described and ascertained the nature of my said invention and in what manner the same is to be performed, I declare that what I claim is:—

In saddles for cycles, motor cycles and the like, the combination of a frame, a saddle secured on said frame, rods secured to said saddle, a bar secured to the front end of the saddle and extending forwardly, a coupling on said frame, pivots on opposite sides of said coupling, vertical links secured on said pivots and to the front end of said bar, a support for said saddle, springs secured at their upper ends to said support and movable joints connecting the lower ends of said springs to said rods, substantially as described and for the purpose set forth.

In testimony whereof I affix my signature in presence of two witnesses.

JENS ALLER.

Witnesses:
 HANS PEDERSEN,
 I. KNUDSEN.

Copies of this patent may be obtained for five cents each, by addressing the "Commissioner of Patents, Washington, D. C."